(12) United States Patent
Cockrell et al.

(10) Patent No.: US 9,473,324 B2
(45) Date of Patent: *Oct. 18, 2016

(54) HOME AUTOMATION SYSTEM AND METHOD INCLUDING REMOTE MEDIA ACCESS

(75) Inventors: Roger A. Cockrell, San Antonio, TX (US); Steven Michael Wollmershauser, San Antonio, TX (US); Thomas S. Webster, Mystic, CT (US); Brian Wilson, San Antonio, TX (US); Alison Raphael, Campbell, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/532,095

(22) Filed: Jun. 25, 2012

(65) Prior Publication Data

US 2012/0326835 A1 Dec. 27, 2012

Related U.S. Application Data

(63) Continuation of application No. 11/600,599, filed on Nov. 16, 2006, now Pat. No. 8,230,466.

(51) Int. Cl.
*G05B 19/02* (2006.01)
*H04L 12/66* (2006.01)

(52) U.S. Cl.
CPC .................................... *H04L 12/66* (2013.01)

(58) Field of Classification Search
CPC ............ H04L 12/66; H04L 29/06027; H04N 5/44543; H04N 7/17318; H04N 5/4403; G08C 17/02

USPC ................................................ 340/4.11, 4.31
See application file for complete search history.

(56) References Cited

U.S. PATENT DOCUMENTS

| | | | |
|---|---|---|---|
| 4,567,557 A | 1/1986 | Burns | |
| 5,086,385 A | 2/1992 | Launey et al. | |
| 5,237,305 A | 8/1993 | Ishikuro et al. | |
| 5,999,525 A | 12/1999 | Krishnaswamy et al. | |
| 6,029,092 A | 2/2000 | Stein | |
| 6,133,847 A * | 10/2000 | Yang ................ | G05B 19/0426 340/12.25 |
| 6,192,282 B1 | 2/2001 | Smith et al. | |

(Continued)

OTHER PUBLICATIONS

Media Controller—Control Your Music, Control Your Home, www.control4.com, (2 pgs).

(Continued)

*Primary Examiner* — An T Nguyen
(74) *Attorney, Agent, or Firm* — Toler Law Group, PC

(57) ABSTRACT

A media player device includes a first, a second, and a third interface, and a processor. The first interface communicates with a residential gateway via a wide area network and/or a local area network, and the residential gateway is coupled to a plurality of electronic devices. The second interface communicates directly with at least one of the plurality of electronic devices. The third interface communicates with one or more electronic devices of the plurality of electronic devices via the local area network. The processor is configured to selectively transmit a request via the second interface when the media player device is proximate to the first electronic device, via the third interface when the media player device is not proximate to the first electronic device and is within range of the local area network, and via the first interface when the media player device is outside the range.

18 Claims, 11 Drawing Sheets

(56) References Cited

U.S. PATENT DOCUMENTS

| | | | |
|---|---|---|---|
| 6,198,079 B1 | 3/2001 | Essig | |
| 6,208,384 B1* | 3/2001 | Schultheiss | H04N 5/38 348/552 |
| 6,211,870 B1 | 4/2001 | Foster | |
| 6,229,433 B1 | 5/2001 | Rye et al. | |
| 6,259,706 B1 | 7/2001 | Shimada | |
| 6,380,866 B1 | 4/2002 | Sizer, II et al. | |
| 6,507,762 B1 | 1/2003 | Amro et al. | |
| 6,563,430 B1* | 5/2003 | Kemink | H04N 21/42202 340/12.22 |
| 6,731,201 B1 | 5/2004 | Bailey et al. | |
| 6,778,868 B2 | 8/2004 | Imamura et al. | |
| 6,791,467 B1 | 9/2004 | Ben-Ze'ev | |
| 6,838,978 B2 | 1/2005 | Aizu et al. | |
| 6,919,790 B2 | 7/2005 | Kanazawa | |
| 6,967,565 B2 | 11/2005 | Lingemann | |
| 7,006,006 B2* | 2/2006 | Witkow | G08C 17/00 340/12.3 |
| 7,012,653 B1* | 3/2006 | Strickland | H04N 7/163 348/553 |
| 7,064,675 B2* | 6/2006 | Zigmond | G08C 17/02 340/12.51 |
| 7,079,951 B2 | 7/2006 | Conner et al. | |
| 7,110,836 B2 | 9/2006 | Sturm et al. | |
| 7,113,837 B2 | 9/2006 | Takemoto et al. | |
| 7,114,554 B2 | 10/2006 | Bergman et al. | |
| 7,116,264 B2 | 10/2006 | Griesau et al. | |
| 7,120,462 B2 | 10/2006 | Kumar | |
| 7,123,242 B1 | 10/2006 | Henty | |
| 7,124,356 B1 | 10/2006 | Alsafadi et al. | |
| 7,136,709 B2 | 11/2006 | Arling et al. | |
| 7,143,214 B2 | 11/2006 | Hayes et al. | |
| 7,218,243 B2* | 5/2007 | Hayes | G08C 17/02 340/12.25 |
| 7,904,074 B2* | 3/2011 | Karaoguz | H04L 12/2803 455/418 |
| 8,230,466 B2* | 7/2012 | Cockrell | H04L 12/66 725/81 |
| 8,421,602 B2* | 4/2013 | Madonna | G01S 5/02 340/12.22 |
| 8,552,843 B2* | 10/2013 | Dizechi | G08C 17/02 340/12.22 |
| 8,601,526 B2* | 12/2013 | Nishimura | H04N 5/44543 725/102 |
| 2001/0039460 A1 | 11/2001 | Aisa | |
| 2001/0041982 A1 | 11/2001 | Kawasaki et al. | |
| 2002/0002627 A1 | 1/2002 | Stead et al. | |
| 2002/0111698 A1 | 8/2002 | Graziano et al. | |
| 2002/0171379 A1 | 11/2002 | Adamson | |
| 2003/0003876 A1 | 1/2003 | Rumsey | |
| 2003/0005446 A1 | 1/2003 | Jaff et al. | |
| 2003/0011467 A1 | 1/2003 | Suomela | |
| 2003/0034898 A1* | 2/2003 | Shamoon | G08C 17/02 340/12.22 |
| 2003/0036807 A1 | 2/2003 | Fosler | |
| 2003/0050737 A1 | 3/2003 | Osann, Jr. | |
| 2003/0080874 A1* | 5/2003 | Yumoto | G08C 17/02 340/13.23 |
| 2003/0083758 A1 | 5/2003 | Williamson | |
| 2003/0198938 A1 | 10/2003 | Murray et al. | |
| 2004/0003073 A1 | 1/2004 | Krzyzanowski et al. | |
| 2004/0072584 A1 | 4/2004 | Kern | |
| 2004/0073944 A1 | 4/2004 | Booth | |
| 2004/0107447 A1* | 6/2004 | Katagishi | H04N 5/76 725/135 |
| 2004/0111490 A1 | 6/2004 | Im et al. | |
| 2004/0160319 A1 | 8/2004 | Joao | |
| 2004/0203387 A1* | 10/2004 | Grannan | G08C 17/00 455/41.2 |
| 2004/0253945 A1* | 12/2004 | Janik | H04L 12/2856 455/419 |
| 2004/0260407 A1* | 12/2004 | Wimsatt | G05B 15/02 700/19 |
| 2005/0031097 A1 | 2/2005 | Rabenko et al. | |
| 2005/0085193 A1 | 4/2005 | Stromberg et al. | |
| 2005/0088333 A1 | 4/2005 | Allport | |
| 2005/0094610 A1* | 5/2005 | de Clerq | G05B 15/02 370/338 |
| 2005/0184915 A1 | 8/2005 | Nagel et al. | |
| 2005/0225426 A1 | 10/2005 | Yoon et al. | |
| 2005/0239445 A1* | 10/2005 | Karaoguz | H04L 12/2803 455/414.1 |
| 2005/0248444 A1 | 11/2005 | Joao | |
| 2006/0031550 A1* | 2/2006 | Janik | G06F 1/1632 709/231 |
| 2006/0041915 A1* | 2/2006 | Dimitrova | H04L 65/1036 725/81 |
| 2006/0053447 A1 | 3/2006 | Krzyzanowski et al. | |
| 2006/0064526 A1 | 3/2006 | Smith et al. | |
| 2006/0149850 A1 | 7/2006 | Bowman | |
| 2006/0168618 A1* | 7/2006 | Choi | G08C 17/02 725/37 |
| 2006/0174102 A1 | 8/2006 | Smith et al. | |
| 2006/0176188 A1 | 8/2006 | Cho et al. | |
| 2006/0178042 A1 | 8/2006 | Hinkson et al. | |
| 2006/0178777 A1 | 8/2006 | Park et al. | |
| 2006/0179126 A1 | 8/2006 | Fujino et al. | |
| 2006/0184972 A1 | 8/2006 | Rafey et al. | |
| 2007/0107020 A1 | 5/2007 | Tavares | |
| 2007/0136768 A1 | 6/2007 | Kumar | |
| 2007/0154093 A1* | 7/2007 | Dunton | G08C 23/04 382/186 |
| 2007/0165583 A1 | 7/2007 | Pecen | |
| 2007/0279247 A1* | 12/2007 | Rye | G08C 17/02 340/13.25 |
| 2008/0079604 A1* | 4/2008 | Madonna | G01S 5/02 340/13.24 |
| 2008/0117922 A1* | 5/2008 | Cockrell | H04L 12/66 370/401 |
| 2012/0326835 A1* | 12/2012 | Cockrell | H04L 12/66 340/4.31 |

OTHER PUBLICATIONS

System Remote Control—Ultimate Control in the Palm of Your Hand, www.control4.com, (2 pgs).

PlayStation—PlayStation Portable—The PSP, www.us.playstation.com, pp. 1-4.

Control 4—Home Theater Solutions, www.control4.com.

PlayStation Portable Handheld Entertainment System Value Pack, SonyStyle USA—PSP98500, www.sonystyle.com, pp. 1-4.

Broadband Turns Inside Out, 2Wire.com: iNID, www.2wire.com, (2 pgs.).

Chen, Yih-Farn, iMobile EE—An Enterprise Mobile Service Platform, 2003, Kluwer Academic Publishers, 283-297.

Non-Final Office Action for U.S. Appl. No. 11/600,599 mailed Apr. 8, 2009, 19 pages.

Final Office Action for U.S. Appl. No. 11/600,599 mailed Oct. 28, 2009, 27 pages.

Non-Final Office Action for U.S. Appl. No. 11/600,599 mailed Nov. 9, 2010, 57 pages.

Final Office Action for U.S. Appl. No. 11/600,599 mailed Apr. 26, 2011, 36 pages.

Non-Final Office Action for U.S. Appl. No. 11/600,599 mailed Oct. 13, 2011, 36 pages.

Notice of Allowance for U.S. Appl. No. 11/600,599 mailed Apr. 9, 2012, 14 pages.

* cited by examiner

HOME AUTOMATION SYSTEM AND METHOD INCLUDING REMOTE MEDIA ACCESS

CLAIM OF PRIORITY

The present application is a continuation of and claims priority from U.S. patent application Ser. No. 11/600,599 filed on Nov. 16, 2006, the content of which is expressly incorporated herein by reference in its entirety.

FIELD OF THE DISCLOSURE

The present disclosure is generally related to home automation systems and methods including remote media access.

BACKGROUND

In general, current home theater systems may have a media device to store available media content, including audio data and video data. Typically, a representative media device serves as a central store of media content and does not provide access to other possible media storage devices within the home.

Additionally, conventional remote control devices (that are more than just a universal remote control) to control the representative media device may be expensive. While a representative remote control device may be able to control the media device to deliver media content within a residence, the representative remote control device may not provide remote access to the media content. Additionally, the representative remote control device may utilize proprietary communication channels and/or may have limited functionality.

DETAILED DESCRIPTION

Figure 1:
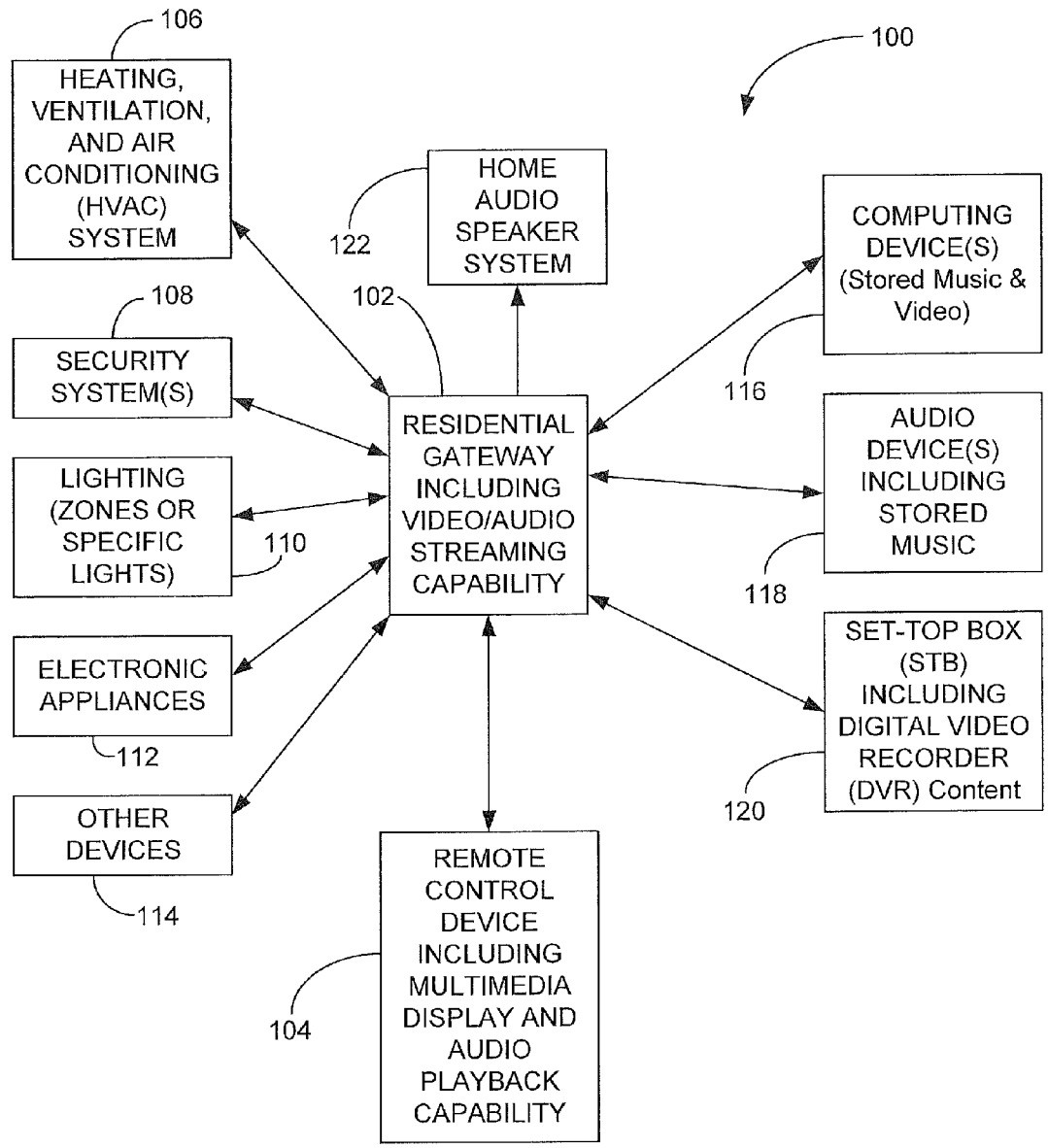
FIG. 1 is a block diagram of a particular illustrative embodiment of a home automation system.

In a particular illustrative embodiment, a portable personal media player includes a first interface, a second interface, a display, an audio output, a keypad and a processor. The first interface communicates via a network with a residential gateway that is communicatively coupled to a plurality of electronic devices. The second interface may communicate wireless commands directly to at least one of the plurality of electronic devices. The display is adapted to display alphanumeric data and video content. The processor is coupled to the first interface, the second interface, the display, the audio output, and the keypad. The processor is responsive to a selection received via the keypad to transmit a request for selected media content to the residential gateway. The processor receives media content related to the request, processes the media content and provides video data to the display and audio data to the audio output. The keypad may include a plurality of dedicated controls, where at least one key is associated with a control function of one of the plurality of electronic devices.

In another particular embodiment, a method is disclosed that includes receiving a command from a remote control device having dedicated control keys at a home automation system. The home automation system may be coupled to an electronic device and to a processing device having a memory. When the command includes a selection of media content, the method further includes determining one or more memory locations of the media content based on the selection, retrieving the identified media content from the one or more memory locations, and streaming the identified media content to a destination device based on the command. When the command includes a control instruction associated with one of the dedicated control keys, the method further includes identifying a device associated with the control instruction, determining a communication protocol associated with the identified device, and transmitting the command to the identified device based on the communication protocol.

In another particular embodiment, a method of accessing a home automation system is disclosed. The method includes accessing, using a remote control device having a plurality of dedicated controls, a user interface associated with a home automation system via a network without disrupting a display of an electrical device. The user interface includes a list of selectable media content. The method further includes receiving a selection related to at least one item from the list and transmitting the selection to the home automation system via the network to retrieve media content stored at one or more electrical devices. Additionally, the method includes receiving media content related to the selection from the home automation system and generating an audio signal related to the received media content via an audio output of the remote control device.

In another particular embodiment, a processor-readable medium including processor-readable instructions executable by a processor is disclosed that is adapted to receive and perform a command responsive to a remote control device at a home automation system that is communicatively coupled to an electrical device and to a processing device having a memory. The processor-readable medium includes instructions to receive a command from a remote control device having dedicated control keys. When the command includes a control instruction associated with one of the dedicated control keys, the processor-readable medium includes instructions to identify a device associated with the control instruction, to determine a communication protocol associated with the identified device, and to transmit the command to the identified device based on the communication protocol.

FIG. 1 is a block diagram of a particular illustrative embodiment of a home automation system 100 that includes a residential gateway 102 and a remote control device 104, which may be a universal remote control device. The home automation system 100 allows a user to control various electronic devices and home theater components via the residential gateway 102. In a particular illustrative embodiment, the residential gateway 102 includes video and audio streaming capability. The remote control device 104 may include multimedia display and audio playback capability.

The residential gateway 102 may be communicatively coupled to a plurality of electronic devices and systems, including a heating, ventilation and air conditioning (HVAC) system 106, a security system 108 (or specific components of an alarm system, such as video cameras, control pads, other components, or any combination thereof), lighting 110 (such as zone lighting, lighting controls for specific lights, or any combination thereof), electronic appliances 112 (such as a coffee maker, stove, bread maker, other electronic appliances 114, or any combination thereof), and a home audio speaker system 122. The residential gateway 102 may also be communicatively coupled to a plurality of processing devices, including one or more computing devices 116, one or more audio devices 118, and one or more set-top box (STB) devices 120. The one or more computing devices 116 may include memory having stored audio and video data. The one or more audio devices 118 may include memory having stored music, which may be stored in a compressed, digitized format, such as Moving Picture Experts Group (MPEG), or other compressed audio/ video formats. The one or more STB devices 120 may include memory to store digital video recorder (DVR) content.

In a particular illustrative embodiment, the remote control device 104 may communicate an access request to the residential gateway 102 via wireless communication, such as via a wireless network, an infrared communications link, another wireless communications link, or any combination thereof. In another particular illustrative embodiment, the remote control device 104 may communicate with the residential gateway 102 via a wired network connection. A user may utilize the remote control device 104 to control one or more of the electronic devices and systems, such as the HVAC system 106, the security system 108, the lighting devices 110, the electronic appliances 112, and the other devices 114. Additionally, a user may utilize the remote control device 104 to access stored media content at one or more of the processing devices, such as the one or more computing devices 116, the one or more audio devices 118, and the one or more set-top box devices 120. In a particular illustrative embodiment, the remote control device 104 may be provided with multiple dedicated control keys, such as a volume control key (such as an increase volume button, a decrease volume button, a mute button, or any combination thereof), a channel selection key (such as an increase channel button, a decrease channel button, or any combination thereof), a play button, a pause button, a fast forward button, a rewind button, a next button, a previous button, a stop button, a record button, an input source selection button (such as a button to control a device to select between available input sources, such as an antenna input, a cable input, another input, or any combination thereof), other types of dedicated control keys or buttons, or any combination thereof. For example, the remote control device 104 may be provided with control keys similar to a universal remote control device to control televisions, video cassette recorders (VCRs), digital video disk (DVD) devices, home stereo equipment, other devices, or any combination thereof. In a particular embodiment, the play button and the pause button may be combined to form a play/pause button. Similarly, other dedicated buttons may be combined.

In a particular illustrative, non-limiting embodiment, the remote control device 104 may be adapted to display video content and to reproduce compressed audio data via an integrated speaker or other audio output, such as a headphone interface or jack. The residential gateway 102 may be adapted to receive a media content request from the remote control device 104. The media content request may include an indication of a destination device, such as an Internet protocol address, a device name, a media access control (MAC) address or other type of device indication. The residential gateway 102 may identify particular media content based on the media content request, retrieve the identified media content from one or more of the processing devices 116, 118, and 120, and stream the requested media content to a particular destination device associated with the destination device indicated by in the media content request. In a particular embodiment, the destination device may be the remote control device 104. In another particular embodiment, the destination device may include a selected one of the one or more computing devices 116, a selected one of the one or more audio devices 118, a selected one of the one or more STB devices 120, a home audio speaker system 122, or another destination device. In another particular embodiment, the residential gateway 102 may stream selected media content to each of the processing devices.

In a particular illustrative embodiment, the residential gateway 102 may communicate with the one or more electronic devices and systems 106, 108, 110, 112, 114, and 122 via a wired network, a wireless network, or any combination thereof. Additionally, each electronic device or system, such as the HVAC system 106, the security system 108, the lighting 110, the electronic appliances 112, the other devices 114, and the home audio speaker system 122 may be accessible using a protocol that may be specific to each particular device. For example, the HVAC system 106 may be controlled using a protocol specific to the HVAC system. Alternatively, the HVAC system 106 may communicate using a standard device protocol, such as Internet Protocol. The residential gateway 102 may communicate with the one or more processing devices, such as the one or more computing devices 116, the one or more audio devices 118, and the one or more STB devices 120 via an Internet protocol network, another type of network, or a direct connection, such as a Universal Serial Bus (USB) connection.

In a particular illustrative embodiment, the remote control device 104 may interact with the residential gateway 102 via a web browser to access a web page that includes one or more selectable indicators. A user may select one such indicator to access stored media content (such as audio data, video data, or any combination thereof) stored at one or more of the computing devices, such as the one or more computing devices 116, the one or more audio devices 118, and the one or more STB devices 120. The user may utilize the remote control device 104 to control the residential gateway 102 to retrieve selected media content and to stream the selected media content to a destination, such as the remote control device 104. Additionally, a user may select an indicator to control, for example, the HVAC system 106. For example, a user may input a desired temperature via the user interface. The residential gateway 102 may determine a protocol associated with the HVAC system 106 and adjust a temperature setting of the HVAC system 106 according to the desired temperature input. In another particular embodiment, a user may select an alarm system indicator. The remote control device 104 may allow the user to view security camera footage (stored or live) of the security system 108 on a display of the remote control device 104. Alternatively, the user may utilize the remote control device 104 to select a destination, such as a television, for display of the security camera footage.

In general, the home automation system 100 enables a user to access media content stored at home devices, such as video content, audio content, DVR content, and other media content, via a software-enabled personal media player, such as the remote control device 104. In a particular embodiment, a user may utilize the remote control device 104 to access the home automation system 100 via a wide area network, such as the Internet, to remotely access all content (audio and video) within the user's home. Moreover, a user may utilize the remote control device 104 to access and control other electronic devices within the user's home.

In a particular illustrative embodiment, the remote control device 104 allows a user to access and control in-home media devices, such as the one or more computing devices 116, the one or more audio devices 118, and the one or more STB devices 120. The remote control device 104 may operate as a universal remote control device to control such devices locally and as a portable audio/video playback device, so that a user may enjoy selected media content outside the presence of devices playing the media content. Selected audio and video data may be retrieved and reproduced by the remote control device 104, which may be carried by the user, allowing the user to move freely without having to activate televisions and/or stereos in the user's presence (such as in a separate room of the user's home). In a particular illustrative embodiment, a user may sit on his or her patio and watch a digitally recorded television program on a display of the remote control device 104, where the digitally recorded television program is retrieved from stored media content of a DVR in a room inside the home.

Figure 2:
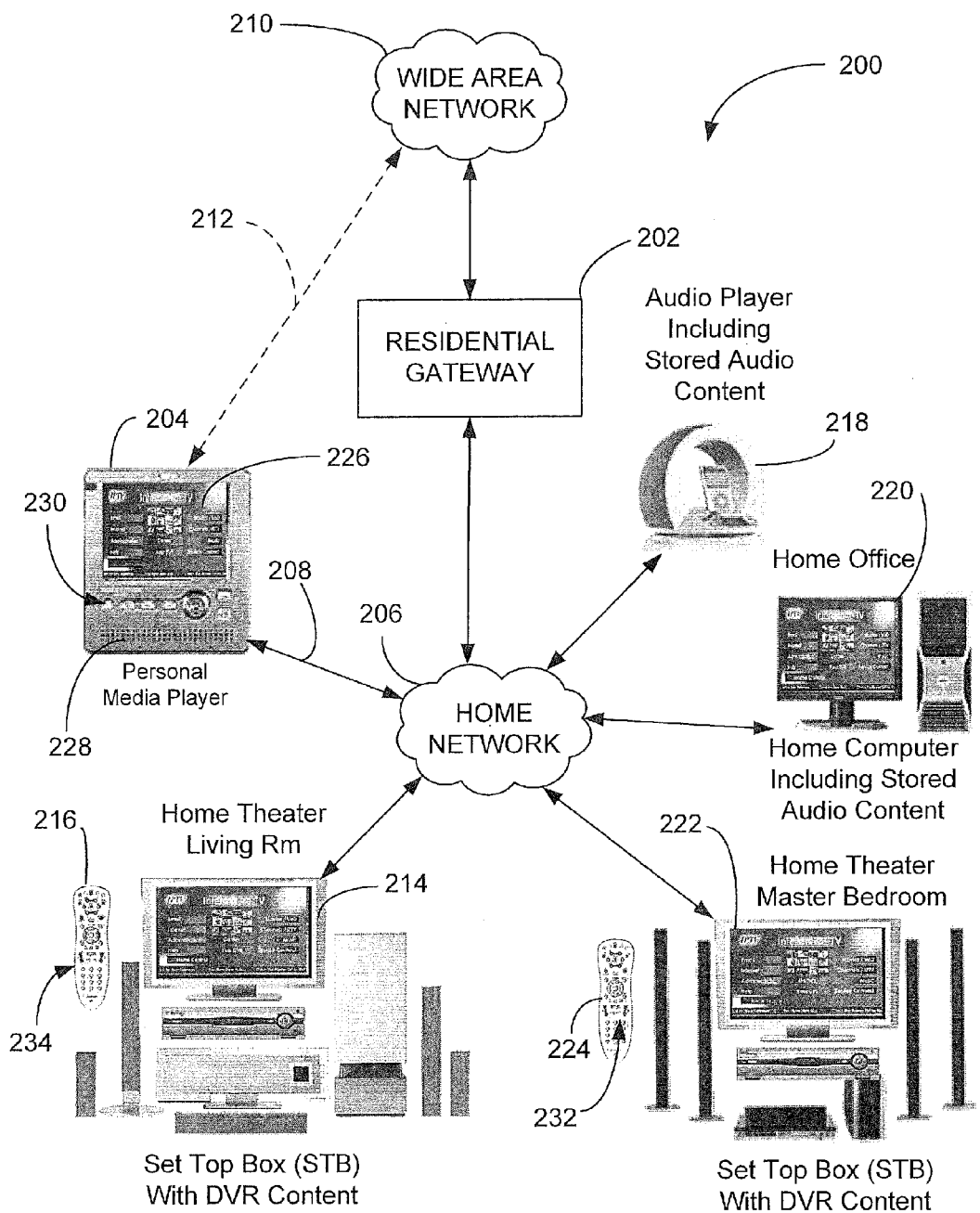
FIG. 2 is a block diagram of a second particular illustrative embodiment of a home automation system.

FIG. 2 is a block diagram of a second particular illustrative embodiment of a home automation system 200 including a residential gateway 202 and a personal media player 204. The home automation system 200 may also include a connection to a wide area network 210, such as the Internet. Additionally, the home automation system 200 may include a first home theater system 214 having a remote control 216, an audio player 218, and a home computer system 220. Further, the home automation system 200 may include a second home theater system 222 having a remote control 224, which may be coupled a home network 206. In a particular illustrative, non-limiting embodiment, the home network 206 may be an Internet Protocol (IP) network. In another particular illustrative, non-limiting embodiment, the home network 206 may be a wireless network hosted by a wireless router, which may be within the residential gateway 202 or which may be a separate wireless routing device (not shown) that is coupled to the residential gateway 202. In a particular embodiment, the wireless network may support communications via an 802.11x protocol.

In a particular embodiment, the residential gateway 202 may be communicatively coupled to the home network 206. The personal media player 204 may communicate with the residential gateway 202 over the home network 206 via a wireless link 208. Alternatively, the personal media player 204 may communicate with the residential gateway 202 using a wireless link 212 via a wide area network 210.

In a particular illustrative embodiment, the residential gateway 202 can be responsive to control signals from the personal media player 204 to generate a user interface including selectable indicators to access and control in-home media devices, such as the first and second home theater systems 214 and 222, the audio player 218, and the home computer 220. In a particular embodiment, the user interface may be displayed on a display 226 of the personal media player 204, on a display screen of the home computer 220, on the displays associated with the home theater systems 214 and 222, or any combination thereof. In a particular illustrative embodiment, a user may select a destination for display of the user interface using the personal media player 204. In a particular illustrative embodiment, the user interface may be displayed on the personal media player 204 without interrupting the displays of content at the home computer 220 or the first and second home theater systems 214 and 222.

In a particular illustrative, non-limiting embodiment, the personal media player 204 may include dedicated control keys 230, such as a volume control key, a channel selection control key, an input source select key, a pause button, a play button, a stop button, a next button, a previous button, a fast forward button, a rewind button, a record button, other dedicated control buttons, or any combination thereof. In general, the personal media player 204 may include other dedicated control buttons, such as the buttons 232 and 234 shown on remote controls 216 and 224, respectively.

In a particular illustrative embodiment, the residential gateway 202 can be adapted to provide a user interface including a list of available media content, such as audio content stored at the audio player 218; audio content, video content, or any combination thereof, stored at the home computer 220; digital video recorder (DVR) content stored at set-top boxes (STBs) associated with the first and second home theater systems 214 and 222; or any combination thereof. A user may select one or more media content selections via the user interface of the residential gateway 202 using the personal media player 204 and may specify a destination device for the selected media content. In a particular illustrative embodiment, the residential gateway 202 may stream audio data, video data, audio/video data (multimedia data), or any combination thereof to the personal media player 204 via the home network 206, which may be a wireless network. In a particular illustrative embodiment, the personal media player 204 may display video data via the display 226 and reproduce (playback) audio data via one or more speakers 228.

In a particular illustrative embodiment, the personal media player 204 may access the residential gateway 202 via the wide area network 210. For example, a user may take the personal media player 204 to a remote location (e.g., an office, a hotel, or other remote location) that has wireless Internet access, such as via an IEEE 802.11x communications link, a wireless fidelity (WiFi) communications link, a satellite communications link, a cellular communications link, or another wireless communications link. The user may wirelessly connect to the Internet and interact with the residential gateway 202 to access and retrieve media content stored at one or more of the home theater systems 214 and 222, the audio player 218, and the home computer 220. The personal media player 204 may include a storage medium to store received media content for playback at a later time. Alternatively, the residential gateway 202 may stream the requested media content to the personal media player 204 via the wide area network 210. The personal media player 204 may also interact with the residential gateway 202 to download media content from other networks via the Internet (wide area network) 210. For example, a user may utilize the personal media player 204 to control the residential gateway 202 to download particular items from a media content source, such as www.myyahoo.com, napster.com, and other media content sources. The downloaded content may be stored by the residential gateway 202, streamed to the personal media player 204, stored at the personal media player 204, or any combination thereof.

Figure 3:
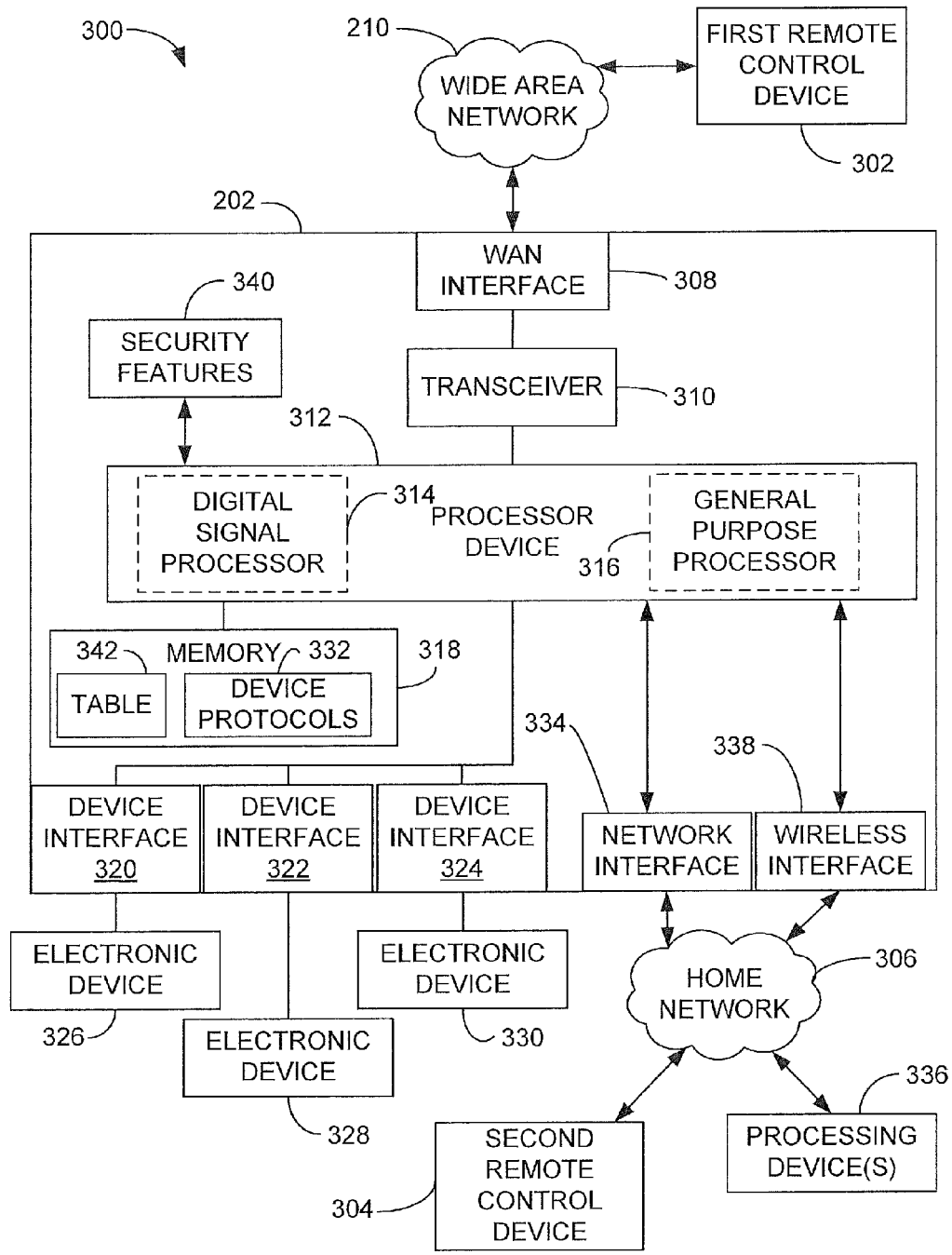
FIG. 3 is a block diagram of a particular illustrative embodiment of a residential gateway, such as the residential gateways shown in FIGS. 1 and 2.

FIG. 3 is a block diagram of a particular illustrative embodiment of a home automation system 300 including a residential gateway 202. The residential gateway 202 may be coupled to a first remote control device 302 via a wide area network 210, such as the Internet. The residential gateway 202 may be coupled to one or more processing devices 336 and to a second remote control device 304 via a home network 306, which may be a wired or wireless network. The residential gateway 202 may also be coupled to one or more electronic devices 326, 228, and 330, such as residential lighting, a coffee pot, a stove, a security system, a heating, ventilation and air conditioning (HVAC) system, and other electronic devices within a customer premises.

The residential gateway 202 may include a wide area network (WAN) interface 308, a transceiver 310, and a processor device 312, which may include a digital signal processor 314 and a general purpose processor 316. The processor device 312 may also include a graphics processor (not shown). The residential gateway 202 may include a memory 318; device interfaces 320, 322, and 324; a network interface 334; and a wireless network interface 338. In a particular illustrative embodiment, the WAN interface 308 communicatively couples the residential gateway 202 to the wide area network 210. The device interfaces 320, 322, and 324 couple the residential gateway 202 to the electronic devices 326, 328, and 330, respectively. The network interface 334 and the wireless interface 338 may enable the one or more processing devices 336 and the second remote control device 304 to communicate with the residential gateway 202 via the home network 306.

In a particular illustrative embodiment, the remote control devices 302 and 304 may be personal media players adapted to display video data and to reproduce audio data. The remote control devices 302 and 304 may interact with the residential gateway 202 to control one or more of the electronic devices 326, 328, and 330. In a particular embodiment, for example, the residential gateway 202 may provide a graphical user interface for user interaction via the first remote control 302. A user may select a selectable indicator associated with a particular electronic device, such as the electronic device 326, which may be a particular light in a room of a residence. The user may select a particular command to control the electronic device 326, such as "turn off," "turn on," or "dim." The residential gateway 202 may determine a communication protocol associated with the electronic device 326 from the device protocols 332 stored in the memory 318, and generate a command via the determined communication protocol to control the electronic device 326 according to the user input. In general, the residential gateway 202 may be adapted to communicate with any device connected to the home network 306, via a wired or wireless connection or via a wide area network, such as the Internet. If a device protocol is not currently available in the memory 318, the processor 312 may be adapted to search the Internet (wide area network) 210 to identify an appropriate device protocol and to download the appropriate device protocol. The residential gateway 202 may then utilize the downloaded device protocol to communicate with the electronic device.

In another particular illustrative embodiment, the first remote control device 302 may transmit an access request to the residential gateway 202. The residential gateway 202 may receive the access request via the WAN interface 308 and the transceiver 310. The processor device 312 may process the access request according to one or more security features 340. For example, the processor device 312 may perform an authentication procedure to authenticate the first remote control device 302. For example, the access request may include a remote device identifier and associated password information. The processor device 312 may compare the remote device identifier and associated password information to a table 342 to authenticate the first remote control device 302. If the processor device 312 is unable to authenticate the first remote control device 302, the processor device 312 may either ignore the access request or transmit a refusal to the first remote control device 302. If the processor device 312 successfully authenticates the first remote control device 312, the processor device 312 may transmit a graphical user interface to the first remote control device 302, providing a list of selectable indicators.

If the user selects a media content menu option, the residential gateway 202 may transmit a graphical user interface related to media content options to the first remote control device 302. If the user selects one or more media content selections, the residential gateway 202 may receive a media content access request associated with stored media content of the home automation system 300. The processor device 312 may identify one or more media selections from the media access request. The processor device 312 may retrieve the identified media selections from the memory 318 (if the media content is stored in the residential gateway 202) or from selected processing devices of the one or more processing devices 336 via the home network 306. The processor device 312 may determine a destination for the retrieved media selections and may transmit the retrieved media selections to the determined destination. In a particular illustrative embodiment, the destination may be the first remote control device 302 and the processor device 312 may stream the selected media content via the transceiver 310 to the first remote control device 302, which may play the streamed media content via a display at the first remote control device 302 or store the media content.

Figure 4:
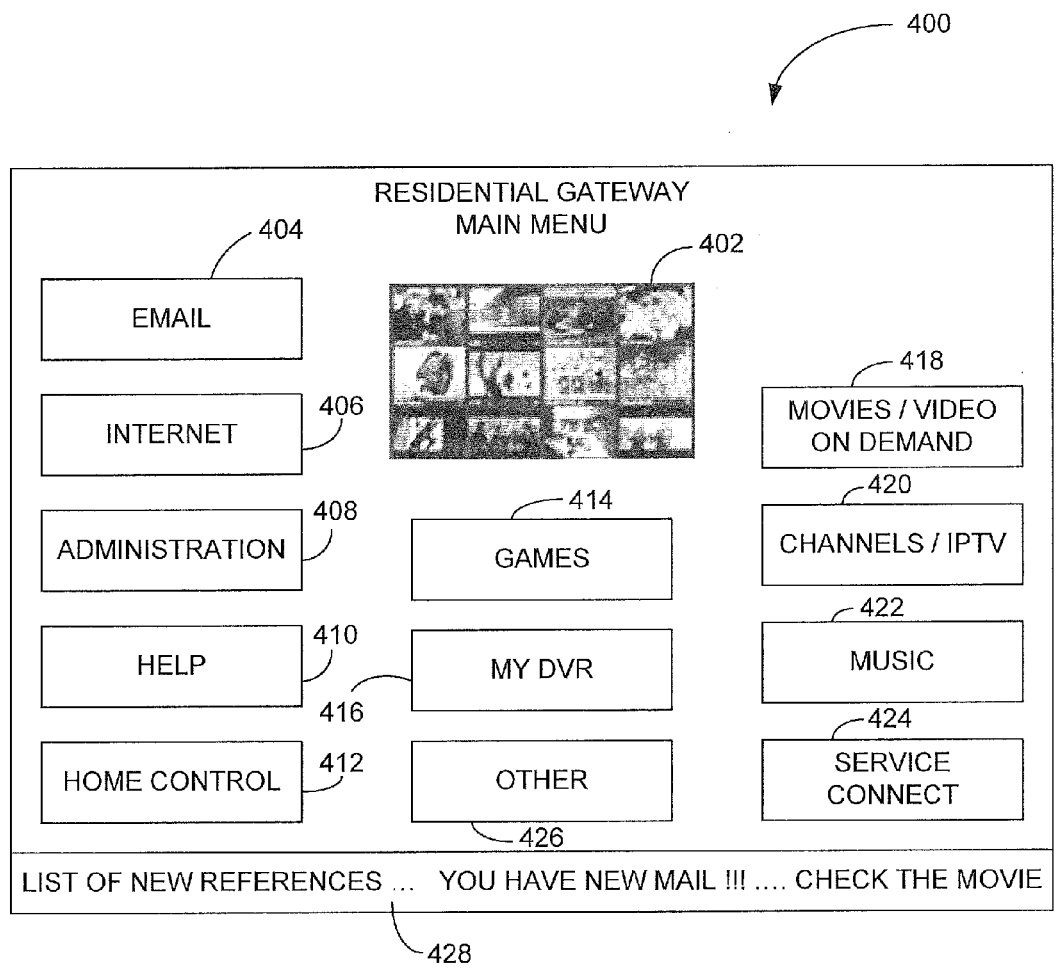
FIG. 4 is a block diagram of a particular illustrative embodiment of a graphical user interface of a home automation system.

FIG. 4 is a block diagram of a particular illustrative embodiment of a graphical user interface 400 to access various control functions of a home automation system. The graphical user interface 400 may include graphical or video content, such as the image 402. Additionally, the graphical user interface 400 may include selectable indicators, such as an email indicator 404, an Internet indicator 406, an administration indicator 408, a help indicator 410, a home control indicator 412, a games indicator 414, a "MY DVR" indicator 416, a movie/video on demand (VOD) indicator 418, a channels/Internet Protocol Television (IPTV) indicator 420, a music indicator 422, a service connect indicator 424, and an other indicator 426. In a particular embodiment, the other indicator 426 may provide access to another control menu related to another controllable feature, such as outdoor lighting, an outdoor sprinkler system, other external systems, or any combination thereof. In another particular embodiment, the other indicator 426 may provide access to a control menu related to a separate facility, such as a business to allow remote access to business systems (e.g., an office security system, office lighting, and other systems). The indicators may include user selectable buttons, images, menus, other types of selectable elements, or any combination thereof. Additionally, the graphical user interface 400 may include a status bar 428 to indicate recent changes within the system.

In a particular illustrative embodiment, a user may select a user selectable indicator to access a menu or device associated with the particular indicator. For example, selecting the "MY DVR" indicator 416 may cause the residential gateway, such as the residential gateway 202 of FIGS. 2 and 3, to dynamically generate a list of DVR content stored at a set-top box for selection by a user. Selection of the music indicator 422 may cause the residential gateway to dynamically generate a list of music content stored at an audio device, a computer, a home theater system, or any combination thereof, for selection by a user.

Figure 5:
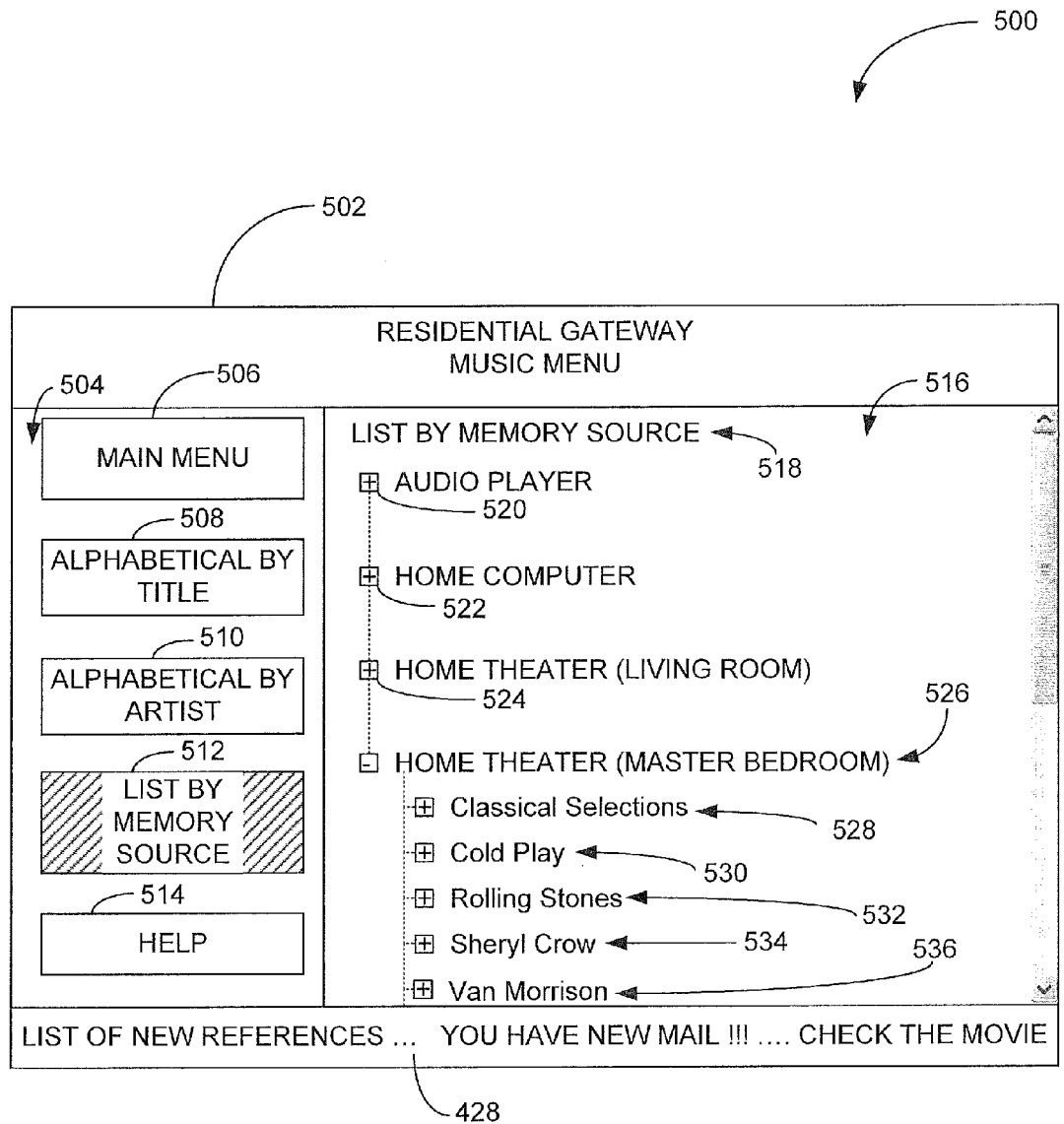
FIG. 5 is a block diagram of a particular illustrative embodiment of a graphical user interface to access stored media content.

FIG. 5 is a block diagram of a particular illustrative embodiment of a music menu of a graphical user interface 500 to access stored media content via a residential gateway. The graphical user interface 500 may include a title bar 502, a menu pane 504, and a data pane 516. The menu pane 504 may include a main menu indicator 506, an alphabetical by title indicator 508, an alphabetical by artist indicator 510, a list by memory source indicator 512, and a help indicator 514. In the embodiment shown by FIG. 5, the list by memory source indicator 512 is selected, and the data pane 516 includes a list of music organized by memory source 518. The list includes an expandable list 520 of music stored in an audio player, an expandable list 522 of music stored in a home computer, an expandable list 524 of music stored in a home theater associated with a living room of the user, and an expanded list 526 of music stored in a home theater associated with a master bedroom of the user. The expanded list 526 includes a list of available audio content indicators organized by stored CDs, including an expandable list of "Classical Selections" indicator 528, an expandable list of "Cold Play" indicator 530, an expandable list of "Rolling Stones" indicator 532, an expandable list of "Sheryl Crow" indicator 534, an expandable list of "Van Morrison" indicator 536, and other available audio content indicators that are outside of the visible area of the data pane 516.

In a particular illustrative embodiment, a user may access the music menu graphical user interface 500 via a remote control device, such as the personal media player 204 of FIG. 2. A user may select elements or indicators within the graphical user interface 500 to access and retrieve audio content for playback via the personal media player. Alternatively, a user may select indicators within the graphical user interface 500 and direct the residential gateway to transmit the retrieved audio content to another destination, such as a home stereo system, a television, or other devices.

Figure 6:
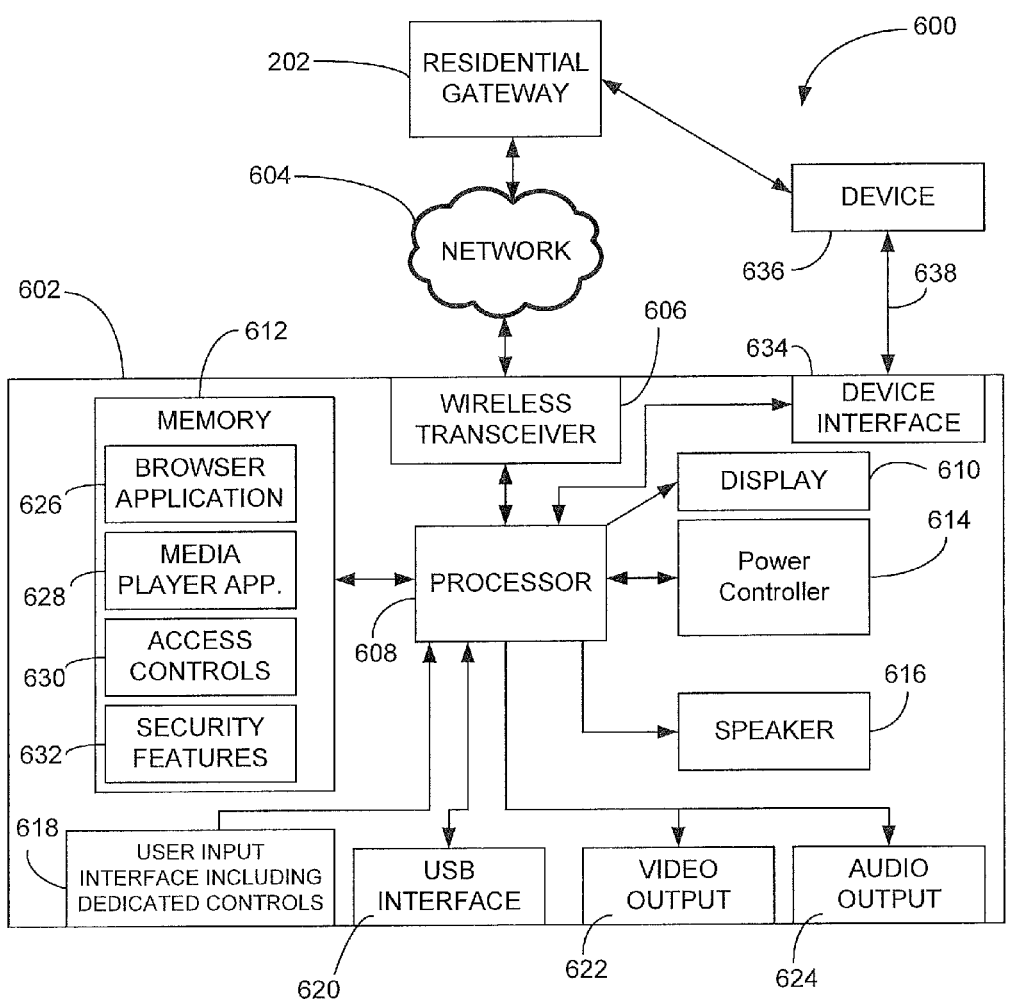
FIG. 6 is a block diagram of a particular illustrative embodiment of a personal media player device, such as the personal media player of FIGS. 1 and 2.

FIG. 6 is a block diagram of a particular illustrative embodiment of a home automation system 600 including a residential gateway 202 and a personal media player (remote control) device 602, such as the personal media player 204 of FIG. 2. The personal media player device 602 may communicate with the residential gateway 202 via a network 604, which may be the Internet or a home network. The personal media player device 602 may include a wireless transceiver 606, a processor 608, a display 610, a memory 612, a power controller 614, a speaker 616, a user input interface 618, a universal serial bus (USB) interface 620, a video output 622, and an audio output 624. The memory 612 may include a browser application 626, a media player application 628, access controls 630 and security features 632. The processor 608 may be coupled to the wireless transceiver 606, the display 610, the memory 612, the power controller 614, the speaker 616, the user input interface 618, the USB interface 620, the video output interface 622, and the audio output interface 624. The personal media player 602 may also include a device interface 634 (such as an infrared interface, a Bluetooth wireless interface, or another type of interface) to communicate with a device 636 via a wireless communications link 638. For example, the device 636 may be a television and the personal media player device 602 may control the volume or control the channel selections directly. Alternatively, the device 636 may be a video cassette recorder (VCR) device, a digital video disk (DVD) player, a stereo, or another media device, which the personal media player 602 may control via the user input interface 618 to directly alter the operation of the device. In a particular illustrative embodiment, the personal media player 602 may control one or more devices and a user may select which device to control. In a particular illustrative embodiment, a user may configure the personal media player device 602 to interact directly with one or more electronic devices by entering a program code associated with a brand and model of the device to be controlled.

In a particular embodiment, the personal media player 602 may receive media content from the residential gateway 202 via the network 604 and may store the received media content in the memory 612. The personal media player 602 may process the received media content using the processor 608 to provide video data to the display 610 and audio data to the speaker 616. In an alternative illustrative embodiment, the processor 608 may provide the video data to the video output interface 622 and the audio data to the audio output interface 624 to provide video and audio data to peripheral devices, such as an external display and an external speaker.

In a particular illustrative embodiment, the processor 608 may load a browser application 626 from the memory 612 to provide a graphical user interface including user selectable indicators to the display 610. The personal media player 602 may receive user input, including user selections related to the user selectable indicators of the graphical user interface via the user input interface 618. In a particular illustrative, non-limiting embodiment, the user input interface 618 may include a keypad, a selection pad, a pen device, a touch screen, other input device, or any combination thereof.

The processor 608 may load a media player application 628 from the memory 612 to decode audio data into an audible format and to play the decoded audio data via the speaker 616. The personal media player 602 may include access controls 630 to control when particular devices may be accessed via the residential gateway 202, to control access to particular stored media, and the like. Additionally, the personal media player 602 may include security features 632, such as a user name and password, to prevent unauthorized access to data stored on the personal media player 602 and to prevent unauthorized access to the residential gateway 202, if the personal media player 602 is lost or stolen.

In a particular illustrative, non-limiting embodiment, the personal media player 602 may be coupled to a personal computer or a memory device via the USB interface 620 to receive stored data, including stored media content, from the attached device. Alternatively, the USB interface 620 may be utilized to export stored data to an external device.

The power controller 614 may be utilized to monitor a status of a power source, such as a battery, and to provide a visible power indicator to the display 610. In a particular illustrative embodiment, the power controller 614 may monitor the personal media player 602 for periods of inactivity and may selectively deactivate components of the personal media player 602 to conserve power when the personal media player 602 is inactive for a predetermined period of time. For example, the power controller 614 may shut off power to the display 610, the speaker 616, the processor 608, the memory 602, or any combination thereof.

In a particular illustrative embodiment, the processor 608 may be adapted to selectively transmit instructions to control a particular device, such as the device 636, via either the residential gateway 202 over the network 604 or directly via the device interface 634 and the wireless link 638. For example, the processor 608 may selectively transmit the command via the residential gateway 202 when the remote control device 602 is outside of the vicinity of the particular device 636. In another particular embodiment, the processor 608 may selectively transmit dedicated control commands directly via the device interface 634 and may transmit menu selections to the residential gateway 202.

Figure 7:
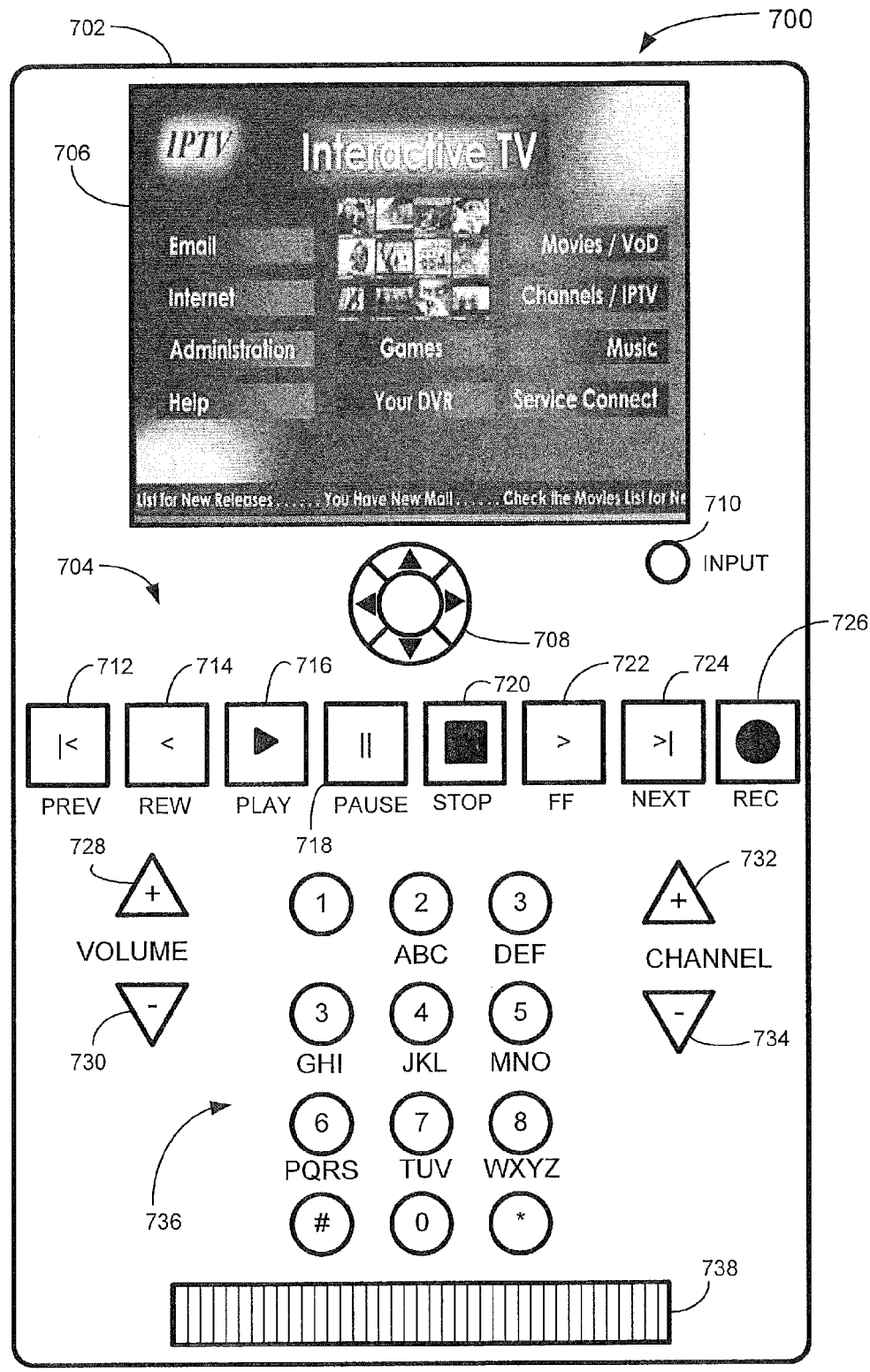
FIG. 7 is a general diagram of a particular illustrative embodiment of a personal media player device.

FIG. 7 is a general diagram of a particular illustrative embodiment of a personal media player device 700. The personal media player device 700 includes a housing 702, a plurality of keys (buttons) 704, a display 706, and a speaker 738. The plurality of keys 704 includes a menu navigation button 708 and a plurality of dedicated control buttons, such as an input source select button 710, a previous button 712, a rewind button 714, a play button 716, a pause button 718, a stop button 720, a fast forward (FF) button 722, a next button 724, a record button 726, an increase volume button 728, a decrease volume button 730, an increase channel button 732, and a decrease channel button 734. The personal media player 700 also includes a plurality of alphanumeric keys 736.

In a particular illustrative embodiment, the input source select key 710 may select between multiple source inputs for a particular electrical device, such as a video cassette recorder (VCR) input, a digital video disc (DVD) player input, an antenna input, a cable input, other inputs, or any combination thereof. In particular illustrative embodiment, the volume control buttons 728 and 730 may be combined into a single tri-state switch to control a volume of a particular device. In a particular illustrative embodiment, the channel control buttons 732 and 734 may be combined into a single tri-state switch to control a channel of a particular device. The buttons 712, 714, 716, 718, 720, 722, and 724 may be utilized to control a DVD player, a compact disk (CD) player, a set-top box, another device, or any combination thereof. The buttons 714, 716, 718, 720, 722, and 726 may be utilized to control, for example, a VCR device.

The alphanumeric buttons 736 may be utilized to enter a channel directly, when controlling a television, for example. In a particular illustrative embodiment, the alphanumeric buttons 736 may be used to enter a name of a selection of music that may be downloaded to the personal media player 700 and stored for playback at a later time. Alternatively, the alphanumeric buttons 736 may be utilized to access search features or network browsing features to allow a user to access the Internet to initiate downloads of audio data to a residential gateway, such as the residential gateway 202 in FIGS. 2 and 3.

Figure 8:
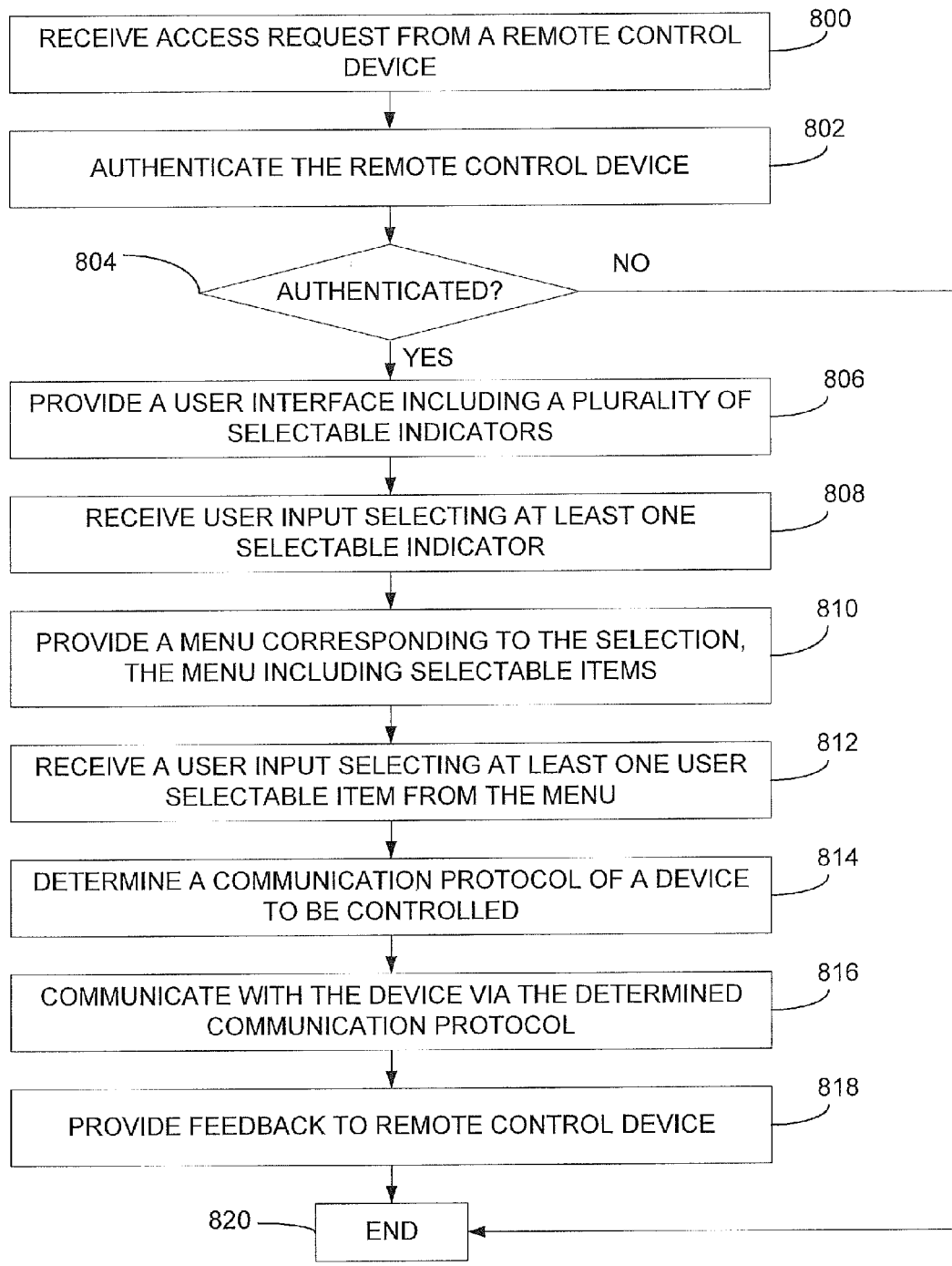
FIG. 8 is a flow diagram of a particular illustrative embodiment of a method of processing an access request received from a personal media player.

FIG. 8 is a flow diagram of a particular illustrative embodiment of a method of processing an access request received from a remote control device. The residential gateway receives an access request from a remote control device, at 800. The residential gateway authenticates the remote control device, at 802. If the remote control device not authenticated at 804, the method terminates at 820.

Returning to 804, if the remote control device is authenticated, the residential gateway provides a user interface including a plurality of selectable indicators to the remote device, at 806. The residential gateway receives a user input selecting at least one selectable indicator, at 808. The residential gateway provides a menu corresponding to the selection, where the menu includes selectable items, at 810. The residential gateway receives a next input selecting at least one selectable item based on the menu, at 812. The selection may be related to a command to control a device, such as a heating, ventilation and air conditioning (HVAC) system. The residential gateway determines a communication protocol of the device to be controlled, at 814. The residential gateway communicates with the device via the determined communication protocol, at 816. The residential gateway provides feedback to the remote control device, at 818. The feedback may include an acknowledgement that a particular control instruction was executed, for example. The method terminates at 820.

Figure 9:
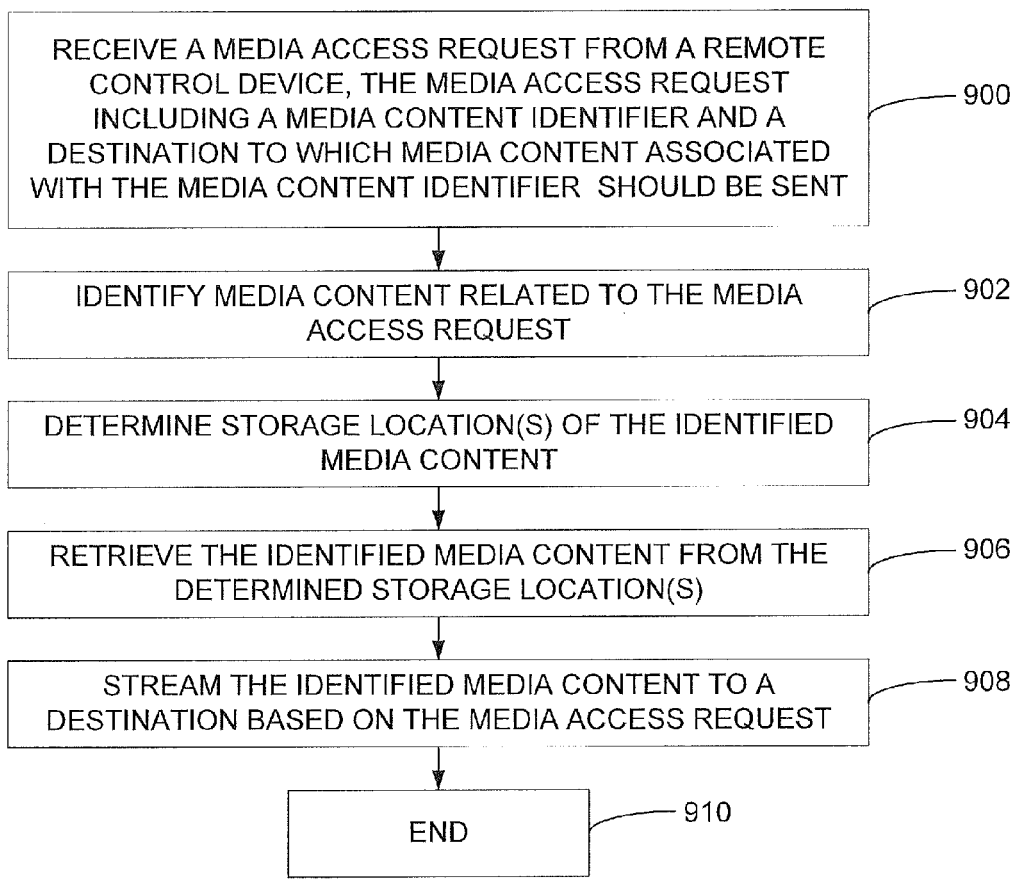
FIG. 9 is a flow diagram of a particular illustrative embodiment of a method of processing a media content request received from a personal media player.

FIG. 9 is a flow diagram of a particular illustrative embodiment of a method of processing a media content request received from a remote control device. A residential gateway receives a media access request from a remote control device at 900, where the media access request includes a media content identifier and a destination to which media content associated with the media content identifier should be sent. The residential gateway identifies media content related to the media access request, at 902. The residential gateway determines one or more storage locations of the identified media content, at 904. The residential gateway retrieves the identified media content from the one or more storage locations, at 906. The residential gateway streams the identified media content to the destination based on the media access request, at 908. In a particular illustrative embodiment, the residential gateway may stream the identified media content to the remote control device, which may be adapted to display video content and play audio content. The method terminates at 910.

Figure 10:
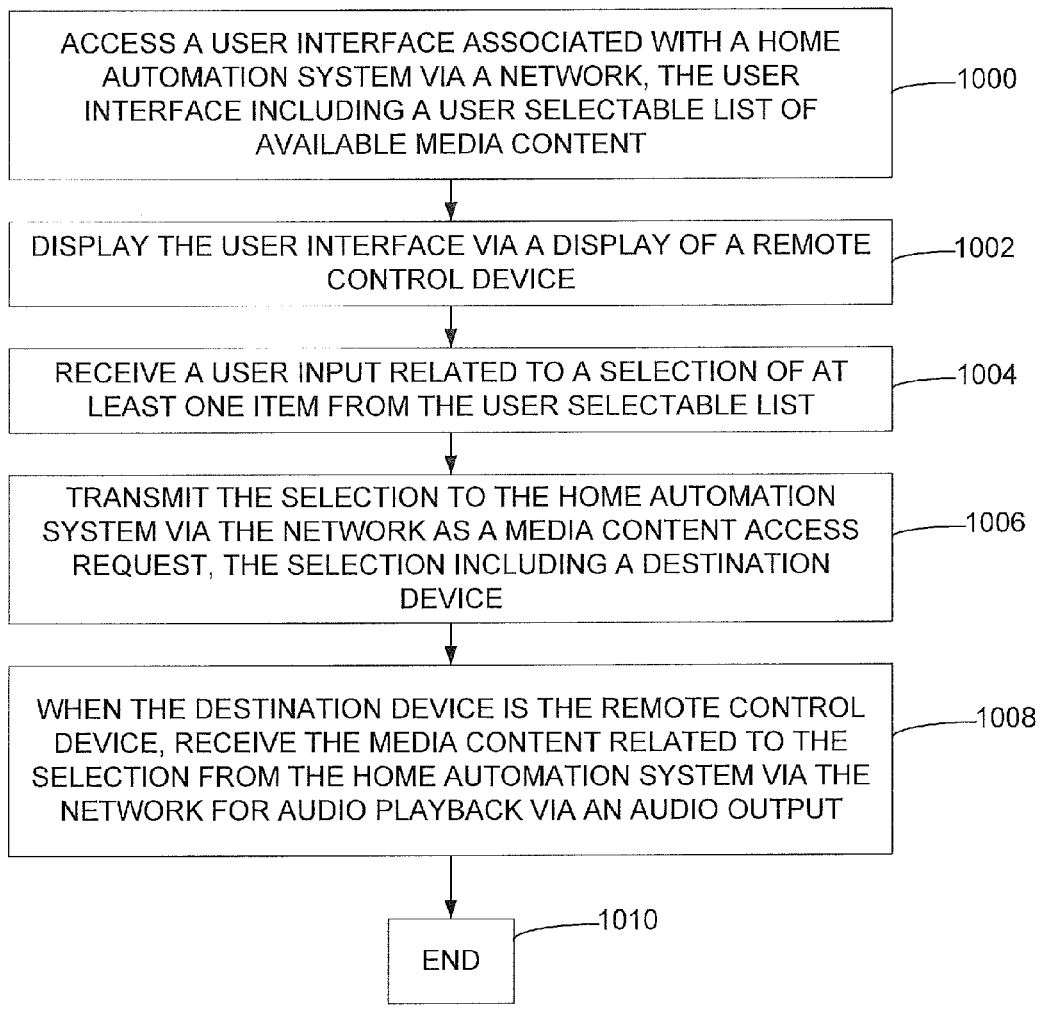
FIG. 10 is a flow diagram of a particular illustrative embodiment of a method of accessing media content.

FIG. 10 is a flow diagram of a particular illustrative embodiment of a method of accessing media content of a home automation system using a remote control device, such as the personal media player of FIG. 6. A remote control device accesses a user interface associated with a home automation system via a network, at 1000. The user interface may include a list of selectable media content. The remote control device may display the user interface, at 1002. The remote control device may receive a user input related to a selection of at least one item from the list, at 1004. The remote control device may transmit the selection to the home automation system via the network as a media content access request, where the selection includes a destination device, at 1006. The remote control device may receive the media content related to the selection from the home automation system via the network for audio playback via an audio output, when the destination device is the remote control device, at 1008. The method terminates at 1010.

In a particular embodiment, the remote control device may specify an alternative destination device, such as a television, a set-top box, a portable audio player, a home computer, or another electronic device. In a particular illustrative embodiment, the remote control device may store the media content for playback at a later time.

Figure 11:
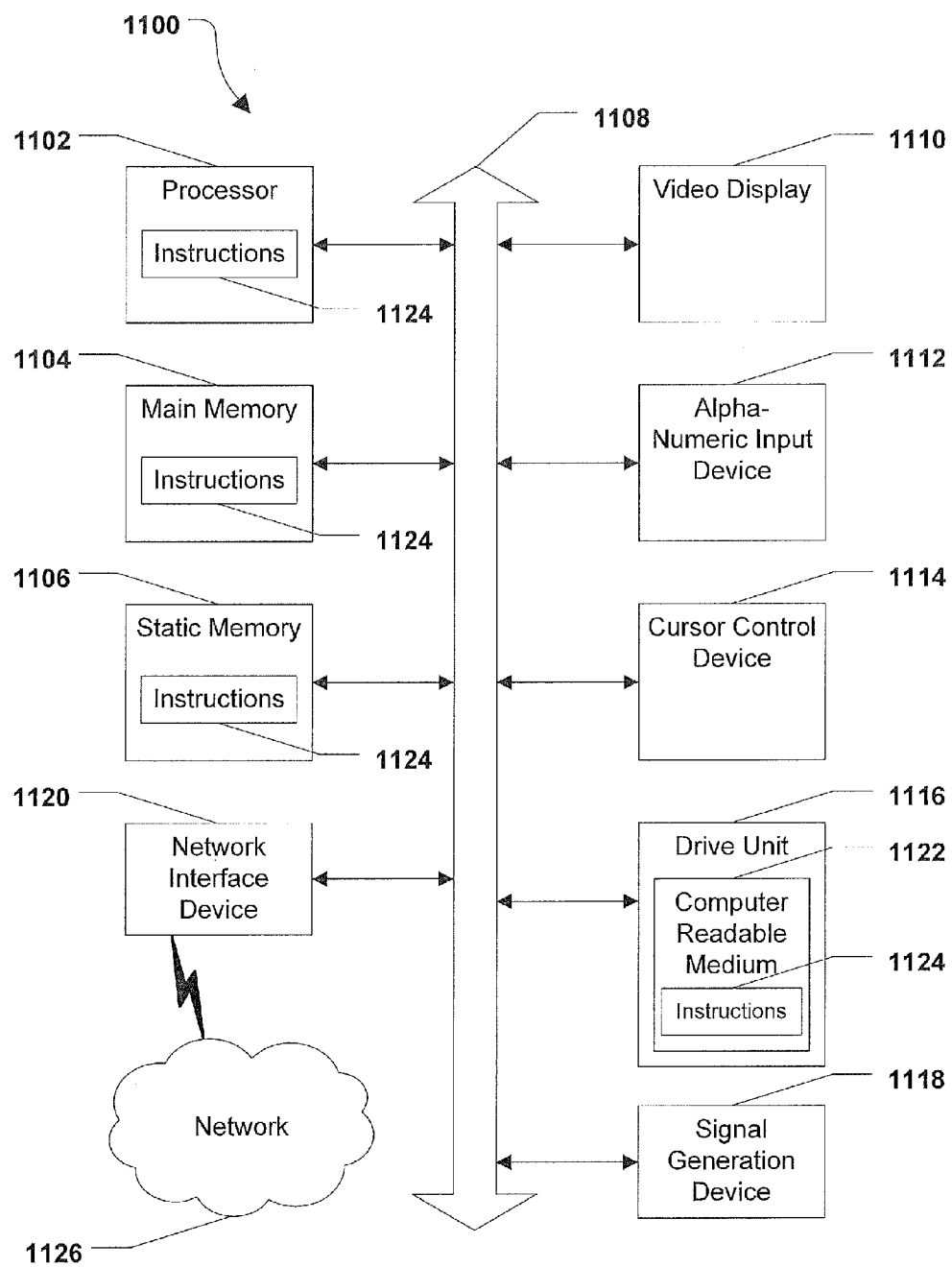
FIG. 11 is a block diagram of a particular embodiment of a general computer system.

Referring to FIG. 11, an illustrative embodiment of a general computer system is shown and is designated 1100, which may be utilized within a residential gateway system, such as residential gateway 202 in FIGS. 2-4, or within a remote control device, such as the remote control device 204 in FIG. 2, the remote control devices 302 and 304 in FIG. 3, and the remote control device 602 in FIG. 6. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106, that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard; and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A media player device, comprising:
a first interface to communicate with a residential gateway via a wide area network, wherein the residential gateway is communicatively coupled to a plurality of electronic devices, wherein the first interface is configured to communicate with a first electronic device of the plurality of devices via the residential gateway, and wherein the first interface is configured to connect to the wide area network via a first wireless protocol;
a second interface to communicate wireless commands directly to the first electronic device of the plurality of electronic devices;
a third interface to communicate wireless commands to the first electronic device via a local area network, wherein the third interface connects with the local area network via a second wireless protocol distinct from the first wireless protocol; and
a processor coupled to the first interface, the second interface, and the third interface, wherein the processor is configured to perform operations including:
selectively transmitting a request directly to the first electronic device via the second interface when the media player device is proximate to the first electronic device;
selectively transmitting the request to the first electronic device via the third interface when the media player device is not proximate to the first electronic device and is connected to the local area network;
selectively transmitting the request to the first electronic device via the first interface when the media player device is not proximate to the first electronic device and is disconnected from the local area network;
transmitting a second request to a second electronic device via the first interface, wherein the second electronic device is located in a facility remote to the residential gateway; and
receiving media content to be displayed via a display device coupled to the processor, the media content sent from the second electronic device responsive to the second request.

2. The media player device of claim 1, wherein the second wireless protocol is an Institute of Electrical and Electronics Engineers 802.11 protocol, and wherein the first wireless protocol is a satellite protocol or a cellular protocol.

3. The media player device of claim 1, wherein the second interface communicates with the first electronic device via a third wireless protocol, and wherein the third wireless protocol is distinct from the first wireless protocol and the second wireless protocol.

4. The media player device of claim 1, further comprising a keypad to receive user input, wherein the keypad comprises a plurality of controls, and wherein a particular control of the plurality of controls is associated with a control function of one of the plurality of electronic devices.

5. The media player device of claim 4, wherein the plurality of controls comprises a play key, a channel control key, an input source select key, a fast forward key, a record key, a next selection key, a previous selection key, or a combination thereof.

6. The media player device of claim 4, wherein the request is generated in response to the user input.

7. The media player device of claim 4, wherein the operations further include selectively transmitting a particular command associated with the control function via the first interface, the second interface, or the third interface to control one of the plurality of electronic devices in response to selection of the particular control of the plurality of controls.

8. The media player device of claim 1, further comprising an audio output coupled to a speaker.

9. The media player device of claim 1, wherein the operations further include:
sending a user interface to the display device, the user interface including a selectable indicator;
receiving a selection related to the selectable indicator; and
transmitting a particular command via one of the first interface and the second interface to control an electronic device based on the selection.

10. The media player device of claim 1, wherein the plurality of electronic devices includes a video storage device, a digital video disk player, a set-top box, a television, or a combination thereof.

11. The media player device of claim 1, wherein the first interface and the third interface comprise a common interface.

12. A method comprising:
sending instructions from a remote control device directly to a first electronic device via a device interface of the remote control device responsive to the remote control device being proximate to the first electronic device;
sending the instructions from the remote control device to the first electronic device using a first wireless protocol via a wireless transceiver and a residential gateway coupled to the first electronic device responsive to the remote control device not being proximate to the first electronic device and being connected to a local area network associated with the residential gateway;
sending the instructions from the remote control device to the first electronic device using a second wireless protocol via the wireless transceiver, the residential gateway, and a wide area network responsive to the remote control device not being proximate to the first electronic device and being disconnected from the local area network, wherein the second wireless protocol is distinct from the first wireless protocol;
sending second instructions from the remote control device to a second electronic device via the wide area network, wherein the second electronic device is located in a facility remote to the residential gateway;
receiving media content to be displayed via a display device;
receiving a media content menu from the residential gateway, wherein the media content is selected from the media content menu; and
displaying the media content menu via the display device.

13. The method of claim 12, wherein the first electronic device includes a security device, a lighting device, or a combination thereof.

14. A computer-readable storage device storing instructions that, when executed by a processor, cause the processor to perform operations comprising:
receiving first input at a control device, the first input corresponding to a first command for a first electronic device located within a premises;
sending first instructions corresponding to the first command via a device interface responsive to the control device being proximate to the first electronic device;
sending the first instructions to a local network using a first wireless protocol via a wireless transceiver responsive to the control device not being proximate to the first electronic device and being connected to the local network;
sending the first instructions to the first electronic device using a second wireless protocol via the wireless transceiver and a wide area network responsive to the control device not being proximate to the first electronic device and being disconnected from the local network, wherein the second wireless protocol is distinct from the first wireless protocol;
sending second instructions to a second electronic device via the wide area network, wherein the second electronic device is located in a facility remote to the premises; and
receiving media content to be displayed via a display device, the media content sent from the first electronic device in response to the first instructions.

15. The computer-readable storage device of claim 14, wherein the operations further comprise sending a user interface to the display device, the user interface configured to display selections to control the first electronic device, and wherein the first input is received via the user interface.

16. The media player device of claim 1, further comprising receiving second media content to be displayed via the display device, wherein the second media content is sent from the first electronic device responsive to the request.

17. The media player device of claim 1, wherein the operations further include:
receiving a media content menu from the residential gateway, wherein the media content is selected from the media content menu; and
displaying the media content menu via the display device.

18. The media player device of claim 1, wherein the second interface is an infrared interface or a wireless interface.

* * * * *